US 6,717,912 B1

(12) United States Patent
Lemyre et al.

(10) Patent No.: US 6,717,912 B1
(45) Date of Patent: Apr. 6, 2004

(54) FAIR DISCARD SYSTEM

(75) Inventors: Richard Lemyre, Brossard (CA); James P. Scott, Santa Clara, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 0 days.

(21) Appl. No.: 09/505,075

(22) Filed: Feb. 16, 2000

(Under 37 CFR 1.47)

Related U.S. Application Data

(60) Provisional application No. 60/136,953, filed on May 28, 1999.

(51) Int. Cl.[7] .................................................. H04J 3/14
(52) U.S. Cl. ........................ 370/230; 370/236; 370/352; 370/396; 370/400; 370/412; 370/428; 710/52; 710/53; 710/56; 711/147; 711/153
(58) Field of Search ................................. 370/236, 351, 370/389, 396–397, 400–401, 412, 428, 230, 352; 710/52, 53, 56; 711/147, 153

(56) References Cited

U.S. PATENT DOCUMENTS

| 5,457,687 | A | | 10/1995 | Newman | |
| 5,805,589 | A | * | 9/1998 | Hochschild et al. | ........ 370/389 |
| 5,912,889 | A | | 6/1999 | Preas et al. | |
| 5,926,459 | A | | 7/1999 | Lyles et al. | |
| 6,490,251 | B2 | * | 12/2002 | Yin et al. | ................ 370/236.1 |

FOREIGN PATENT DOCUMENTS

WO  WO 97 43869  11/1997

OTHER PUBLICATIONS

Copy of International Preliminary Examination Report.

* cited by examiner

Primary Examiner—Dang Ton
Assistant Examiner—Inder Pal Mehra
(74) Attorney, Agent, or Firm—Townsend and Townsend and Crew LLP

(57) ABSTRACT

The present invention is a shared buffer architecture that dynamically allocates buffer size to each of multiple sources depending on buffer pool utilization, estimated per-connection offered load, and the total number of connection established within a given class of service. When the buffer pool is almost empty, each source is allocated a large buffer space, proportional to its estimated offered load. When the buffer pool is more full each source is allocated a reduced buffer space, while maintaining the proportional weighting relationship. The invention keeps track of the amount of input per source and dynamically allocates a proportionate amount of buffer space in the buffer memory for that source. The dynamic allocation is made as a function of the fullness of the memory allocation for all sources. Additionally, thresholds are modulated dynamically as the number of established connections within a given class modulates, providing a predictive aspect to the system, with respect to congestion control. The main objective is to fairly allocate buffer space depending on the amount of traffic and the amount of buffer space taken up by each source. In operation, the memory allocation is readjusted depending on the total number of cells in the buffer memory, the estimated offered load, and the total number of connection established within each class of service, providing a highly dimensional solution to the multi-dimensional problem of congestion management in communication network nodes.

18 Claims, 5 Drawing Sheets

Discard Threshold Functions

Congestion Indication Threshold

FAIR DISCARD SYSTEM

CROSS-REFERENCE TO RELATED APPLICATIONS

This application depends for priority upon U.S. Provisional Patent Application No. 60/136,953 entitled METHOD AND SYSTEM FOR CONGESTION CONTROL IN A CONNECTION ORIENTED COMPUTER NETWORK DEVICE, filed May 28, 1999, and is related to U.S. patent application Ser. No. 09/321,904 issued as U.S. Pat. No. 6,466,579 dated Oct. 15, 2002, entitled BI-MODAL CONTROL SYSTEM AND METHOD FOR PARTITIONING A SHARED OUTPUT BUFFER IN A CONNECTION-ORIENTED NETWORK CONNECTIONS DEVICE, also filed May 28, 1999, both of which are incorporated herein by reference.

BACKGROUND OF THE INVENTION

1. Field of the Invention

This invention relates generally to information transfer systems that buffer information from multiple sources and particularly to a shared buffer architecture that dynamically allocates in a shared buffer pool a buffer size to each source depending on both the buffer pool utilization and the estimated offered load of each individual source.

2. Description of the Background Art

In general, network communication systems interconnect many users in a network. Each user is connected to the network at a port. The network is formed by the interconnection of many nodes where information input at an input port from one user at a source is passed from node to node through the network to an output port and to another user at a destination. The information transferred from source to destination is packetized and each node switches incoming packets at incoming ports to outgoing packets at outgoing ports. For ATM (Asynchronous Transfer Mode) networks, the packets are further divided into cells.

Using current technology, fast packet switches transfer hundreds of thousands of packets per second at every switch port. Each switch port is typically designed to transfer information at a rate from 50 Mbit/s to 2.4 Gbit/s for a broadband integrated service digital network (ISDN). Switch sizes range from a few ports to thousands of ports.

The term "fast packet switch" includes switches capable of handling both variable length packets and fixed length packets. Use of fixed-length packets can simplify the switch design. Fast packet switches using short, fixed-length packets (cells) are referred to as ATM switches. Fast packet switches handle different types of communications services in a single integrated network where such services may include voice, video and data communications. Since voice and video services can tolerate only a limited amount of delay and delay variance through a network, ATM switches are suitable for such services. The ATM standard for broadband ISDN networks defines a cell having a length of 53 bytes with a header of 5 bytes and data of 48 bytes. The ATM Forum Traffic Management Specification has specified a number of Service Class Definitions as follows:

CBR: Continuous Bit Rate. For real-time applications requiring tightly constrained delay and delay variation such as voice and video. The CBR service class requires the consistent availability of a fixed quantity of bandwidth.

RT-VBR: Realtime Variable Bit Rate. For applications where sources transmit at a rate which varies with time (referred to in the art as "bursty"), yet still must receive service with tightly constrained delay and delay variation.

NRT-VBR: Non-Realtime Variable Bit Rate. For bursty applications, having no service requirements related to delay or its variance, but having sensitivity to loss.

UBR: Unspecified Bit Rate. For non-real-time applications, such as file transfer and e-mail, that transmit non-continuous bursts of cells without related service guarantees and therefore without allocated bandwidth resource, without guarantee as to cell loss ratio or cell transfer delay, and without explicit feedback regarding current level of network congestion.

GFR: Guaranteed Frame Rate. Also for non-real-time applications, this service category provides loss guarantees for sources transmitting traffic at or below a contracted minimum rate. Once a source exceeds the contracted minimum rate, traffic above that rate does not receive any loss guarantees.

ABR: Available Bit Rate. For non-real-time applications that permit variation in information transfer rate depending on the amount of bandwidth available in the network.

In a typical ATM switch, the cell processing functions are performed within the nodes of a network. Each node is an ATM switch which includes input controllers (IC's), a switch fabric (SF), output controllers (OC's) and a node control (C). The node control is used for functions including connection establishment and release, bandwidth reservation, buffering control, congestion control, maintenance and network management.

In each switch, the input controllers are typically synchronized so that all cells from input controllers arrive at the switch fabric at the same time and cells can be accepted or rejected according to their priority. The traffic through the switch fabric is slotted and the switch fabric delay equals the sum of the timeslot duration, pipeline delay and the queuing delay.

The node control communicates with the input controllers and the output controllers either by a direct communication path which by-passes the switch fabric or via control cells transmitted through the switch fabric.

External connections to the switch are generally bi-directional. Bi-directional connections are formed by grouping an input controller (IC) and an output controller (OC) together to form a port controller (PC).

The input sequence of cells in a virtual channel is preserved across the switch fabric so that the output sequence of cells on each virtual channel is the same as the input sequence. Cells contain a virtual channel identifier (VCI) in the cell header which identifies the connection to which the cell belongs. Each incoming VCI in the header of each cell is translated in an input controller to specify the outgoing VCI identifier. This translation is performed in the input controller typically by table look-up using the incoming VCI to address a connection table. This connection table also contains a routing field to specify the output port of the switch fabric to which the connection is routed. Other information may be included in the connection table on a per connection basis such as the priority, class of service, and traffic type of the connection.

In an ATM switch, cell arrivals are not scheduled. In a typical operation, a number of cells may arrive simultaneously at different input ports, each requesting the same output port. Operations in which requests exceed the output capacity of the output port are referred to as output contention. Since an output port can only transmit a fixed number (for example, one) cell at a time, only the fixed number of cells can be accepted for transmission so that any other cells routed to that port must either be discarded or must be buffered in a queue. Different methods are employed for routing cells through a switch module, for example, self-routing and label routing.

A self-routing network operates with an input controller prefixing a routing tag to every cell. Typically, the input controller uses a table look-up from a routing table to obtain the routing tag. The routing tag specifies the output port to which the cell is to be delivered. Each switching element is able to make a fast routing decision by inspecting the routing tag. The self-routing network ensures that each cell will arrive at the required destination regardless of the switch port at which it enters.

A label routing network operates with a label in each cell referencing translation tables in each switching element. The label is translated in each switching element and hence any arbitrary network of switching elements may be employed.

Switches have two principal designs, time-division and space division. In a time-division switch fabric, all cells flow through a single communication channel shared in common by all input and output ports. In a space division switch, a plurality of paths are provided between the input and output ports. These paths operate concurrently so that many cells may be transmitted across the switch fabric at the same time. The total capacity of the switch fabric is thus the product of the bandwidth of each path and the average number of paths that can transmit a cell concurrently.

When the traffic load exceeds the available system resources in a network, congestion is present and performance degrades. When the number of cells is within the carrying capacity of the network, all cells can be delivered so that the number of cells delivered equals the number of cells sent without congestion. However, if cell traffic is increased to the level that nodes cannot handle the traffic, congestion results.

Congestion can be brought about by several factors. If nodes in a network are too slow to perform the various tasks required of them (queueing buffers, updating tables, etc.), queues build up, even though excess line capacity exists. On the other hand, even if nodes are infinitely fast, queues will build up whenever the input traffic rate exceeds the capacity of the output traffic rate for any particular group of outputs.

If a node has no free buffers for queueing cells, the node must discard newly arriving cells. For packet data traffic, when a cell is discarded, the packet from which the discarded cell came will be retransmitted, perhaps many times, further extending the congestion epoch.

Buffers are used in an ATM switch to receive and store incoming cells. A certain (fixed) amount of buffer space is reserved for CBR, RT-VBR, and NRT-VBR traffic. The required amount of space is known in advance because traffic from these service categories is policed at the receive side. However, ABR and UBR traffic are not well regulated and may overflow the remaining buffer space, resulting in loss of cells and degrading the quality of other connections.

The available art generally employs one of two buffer architectures. One buffer architecture uses a shared buffer space in which one high-volume connection can overflow the entire buffer leaving no buffer space for other connections. In another buffer architecture, an amount of buffer space is allocated for each connection so that it is often necessary to underutilize the buffer space to guard against overflow. This underutilization is costly since the allocated space is unused much of the time and is not used at all for connections that are not carrying traffic.

SUMMARY OF THE INVENTION

The present invention comprises a shared buffer architecture that dynamically allocates buffer size to each of multiple sources depending on both buffer pool utilization and the estimated offered load of each individual source. When the buffer pool is almost empty, each source is allocated a large buffer space. When the buffer pool is more full, each source is allocated a reduced buffer space, proportional to the weight of the individual connection.

The invention tracks the number of cells received per source and dynamically allocates a proportionate amount of buffer space in the buffer memory for that source. Dynamic allocation is made as a function of the fullness of the buffer memory allocation for all sources, in a manner that fairly allocates buffer space depending on the amount of traffic and the amount of buffer space taken up by each source, while providing some guaranteed buffer space for those connections which require explicit loss objectives. An advantage of the invention is therefore to provide an ability to control the relative fairness a given connection receives (relative to other connections within the same class of service). In operation, the memory allocation is readjusted depending on the total number of cells in the buffer memory.

The method and system of the invention therefore achieves a more efficient allocation whenever the buffer is not full. The upper limit on buffer size (a totally full buffer) is the same as with a fixed buffer, but otherwise the invention is more efficient than static buffer allocation because the available buffer space is optimized to allow each source to use as much buffer space as possible. To each source, the buffer appears larger than is actually available for all sources combined. The invention also enforces requirements, leading to more efficient use of the network, by ensuring that compliant sources are isolated from the effects of misbehavior of non-compliant sources.

A weighted fair discard operation is provided that is efficient over multiple hops. With fixed buffers the risk of discards in subsequent nodes increases exponentially with the number of hops. With dynamic allocation in the present invention, a decreased loss probability is achieved because the system tends to adjust to a steady-state condition, while retaining the ability to dynamically adapt to non-stationary loading patterns.

Although the present invention is particularly useful in ATM networks, other applications of the invention exist wherever shared buffering from multiple sources requires dynamic control.

The discard threshold can be changed to allocate different amounts of memory to the buffer depending on such factors as the quality of service desired, the relative weight within a given class of service, or the number of connections established within a given service class.

The problem of buffer overflow is greatest with UBR and GFR traffic, in which the source is unregulated. With these traffic types, expected to be the predominant type of traffic for several years to come, the effect of the invention is to control bandwidth (through the traffic management part of the system). Explicit forward congestion indication (EFCI) is preferably used to control the source rate.

BRIEF DESCRIPTION OF THE DRAWINGS

The present invention will be readily understood by those having skill in the relevant art by the following detailed description in conjunction with the accompanying drawings.

Figure 1:
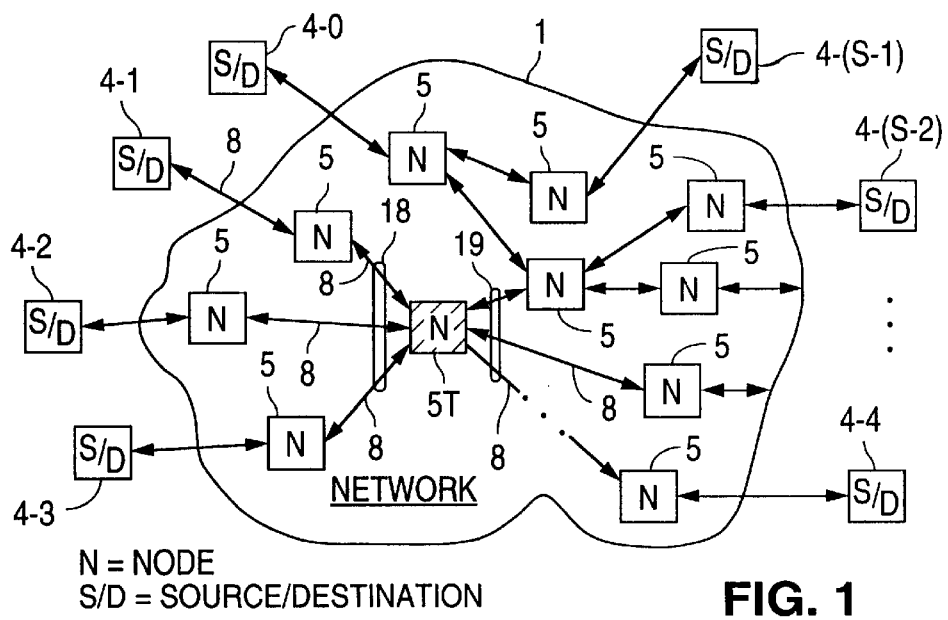
FIG. 1 depicts a schematic block diagram of a plurality of source/destination (S/D) users connected through a multinode network.

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by any claims filed in this application or any related non-provisional patent application.

DETAILED DESCRIPTION OF PREFERRED AND ALTERNATIVE EMBODIMENTS

Overall Network

FIG. 1

Referring first to FIG. 1, a plurality of network users are represented as the source/destination (S/D) 4. Each user typically sends information as a source (S) and receives information as a destination (D). The source (S) of an S/D unit 4 will send information to the destination (D) of some other S/D unit 4. In order for information to be transferred from a source to a destination, each S/D unit 4 connects through a multinode (N) network 1. The network 1 includes many nodes (N) 5. The nodes are connected from node to node so that, in general, any particular one of the S/D units 4 can connect to any one of the other S/D units 4 by forming a chain of nodes 5 in the network 1. In general, the connections between the S/D units 4 and a node 5, and the connections between nodes 5, are by bi-directional links 8 which enable information to be transferred in both directions.

In FIG. 1, the number of nodes (N) 5 shown is for clarity a relatively small number, but the network may include hundreds or more of nodes. Also, the S/D units 4 include S users 4-0, 4-1, 4-2, 4-3, 4-4, ..., 4-(S-2), 4-(S-1). The value of S can be any integer, although S is typically equal to hundreds or higher.

In a typical embodiment, the FIG. 1 communication system is an ATM network in which the unit of transfer of information is a cell. A plurality of cells form packets of information. The network 1 communicates cells and packets so as to support different types of information including images, voice and data.

Virtual Channel

FIG. 2

Figure 2:
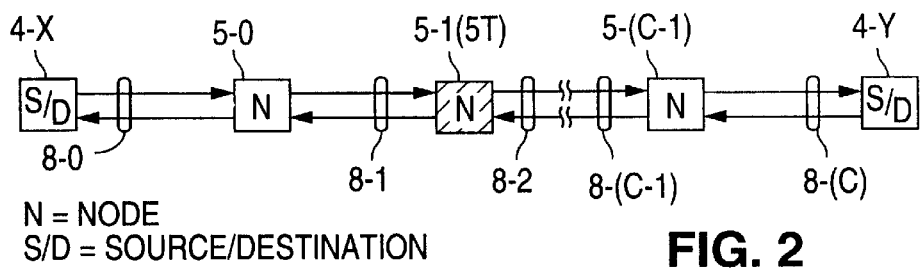
FIG. 2 depicts a schematic representation of a circuit with one S/D user connected to another S/D user through a sequence of nodes in the network of FIG. 1.

In FIG. 2, the S/D unit 4-$x$ connects through a plurality C of nodes (N) 5-0, 5-1 ... 5-(C-1) to the S/D unit 4-$y$.

In FIG. 2, the S/D unit 4-$x$ is typical of any of the S/D units 4 of FIG. 1. For example, the S/D unit 4-$x$ may represent the S/D unit 4-2 in FIG. 1. Similarly, the S/D unit 4-$y$ in FIG. 2 may represent any of the S/D units 4 in FIG. 1. For example, S/D unit 4-$y$ may represent the S/D unit 4-4 in FIG. 1. In such an example, the nodes 5-0, 5-1, ..., 5-(C-1) represent the C nodes in the network 1 of FIG. 1 which are used to connect the S/D unit 4-2 to the S/D unit 4-4.

In FIG. 2, the bi-directional links 8-0, 8-1, ..., 8-(C-1), 8-(C) connect from the S/D unit 4-$x$ through the nodes 5-0, 5-1, ..., 5-(C-1) to the S/D unit 4-$y$. In FIG. 2, information may be transferred from the source (S) in the S/D unit 4-$x$ to the destination (D) in the S/D unit 4-$y$. Similarly, information from the source (S) in the S/D unit 4-$y$ can be transferred to the destination (D) in the S/D unit 4-$x$. While information may be transferred in either direction in FIG. 2, it is convenient, for purposes of explanation to consider transfers between a source (S) and a destination (D), whether that be from the S/D unit 4-$x$ to the S/D unit 4-$y$ or from the S/D unit 4-$y$ to the S/D unit 4-$x$. Regardless of the direction, each transfer is from a source (S) to a destination (D).

S to D Transfers

FIG. 3

Figure 3:
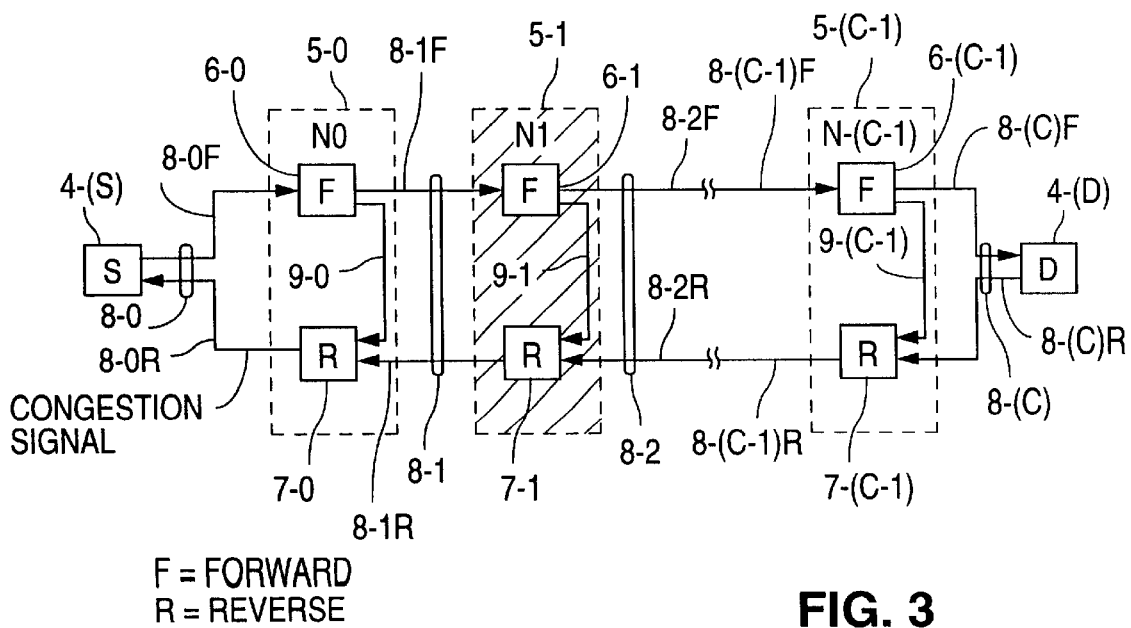
FIG. 3 depicts a schematic representation of the FIG. 2 circuit with a virtual channel connection of the source (S) sending information in a forward direction (F) to a destination (D) and with a reverse direction (R) for transmitting control signals to the source (S).

In FIG. 3, a schematic representation of the circuitry used for a source (S) to destination (D) transfer in the virtual channel of FIG. 2 is shown. In FIG. 3, the source unit 4-(S) in the S/D unit 4-$x$ of FIG. 2 connects to the destination unit 4(D) in the S/D unit 4-$y$ of FIG. 2.

In FIG. 3, each of the links 8-0, 8-1, ..., 8-(C-1), 8-(C) includes a forward (F) channel for transferring information in the forward direction and a reverse (R) channel for transferring information in the reverse direction. The reverse channel in FIG. 3 is associated with the transfer of information from the source unit 4-(S) to the destination unit 4-(D). The reverse channel in FIG. 3 is for the purpose of sending control information used in connection with the network of FIG. 1. The reverse channel (R) is distinguished from the forward channel (F) used for the transfer of information in the forward direction from S/D unit 4-$y$ to S/D unit 4-$x$, as discussed in connection with FIG. 2. Both the forward (F) and the reverse (R) channels are associated with the source unit 4-(S) transfer to the destination unit 4-(D). Each of the nodes in FIG. 3 includes forward (F) circuitry 6 and reverse (R) circuitry 7. In FIG. 3, the forward channels 8-OP, 8-IF, ..., 8-(C-1)F connect as inputs respectively to the forward circuits 6-0, 6-1, ..., 6-(C-1). The forward channel 8-(C)F connects from the node 6-(C-1) to the D unit 4-(D). Similarly, the reverse channels 8-OR, 8-1R, ..., 8-(C-1)R connect from the reverse circuits 7-0, 7-1, ..., 7-(C-1). The reverse channel 8-(C)R connects from the D unit 4-(D) to the reverse circuit 7-(C-1).

In FIG. 3, each of the nodes 5 has a feedback connection 9 connecting from the forward (F) circuit 6 to the reverse (R) circuit 7. Specifically, the feedback channels 9-0, 9-1, ..., 9-(C-1) connect from the forward (F) circuits 6 to the reverse (R) circuits 7 in the node 5-0, 5-1, ..., 5-(C-1), respectively. In the FIG. 3 circuit, a virtual channel connection is made along the forward channel setting up a communication path in the forward direction between the S unit 4-(S) and the D unit 4-(D). Because other virtual channels are also established in the network 1 of FIG. 1, buffering is required at each node and destination including the nodes of FIG. 3.

Simple Node Embodiment

FIG. 4

Figure 4:
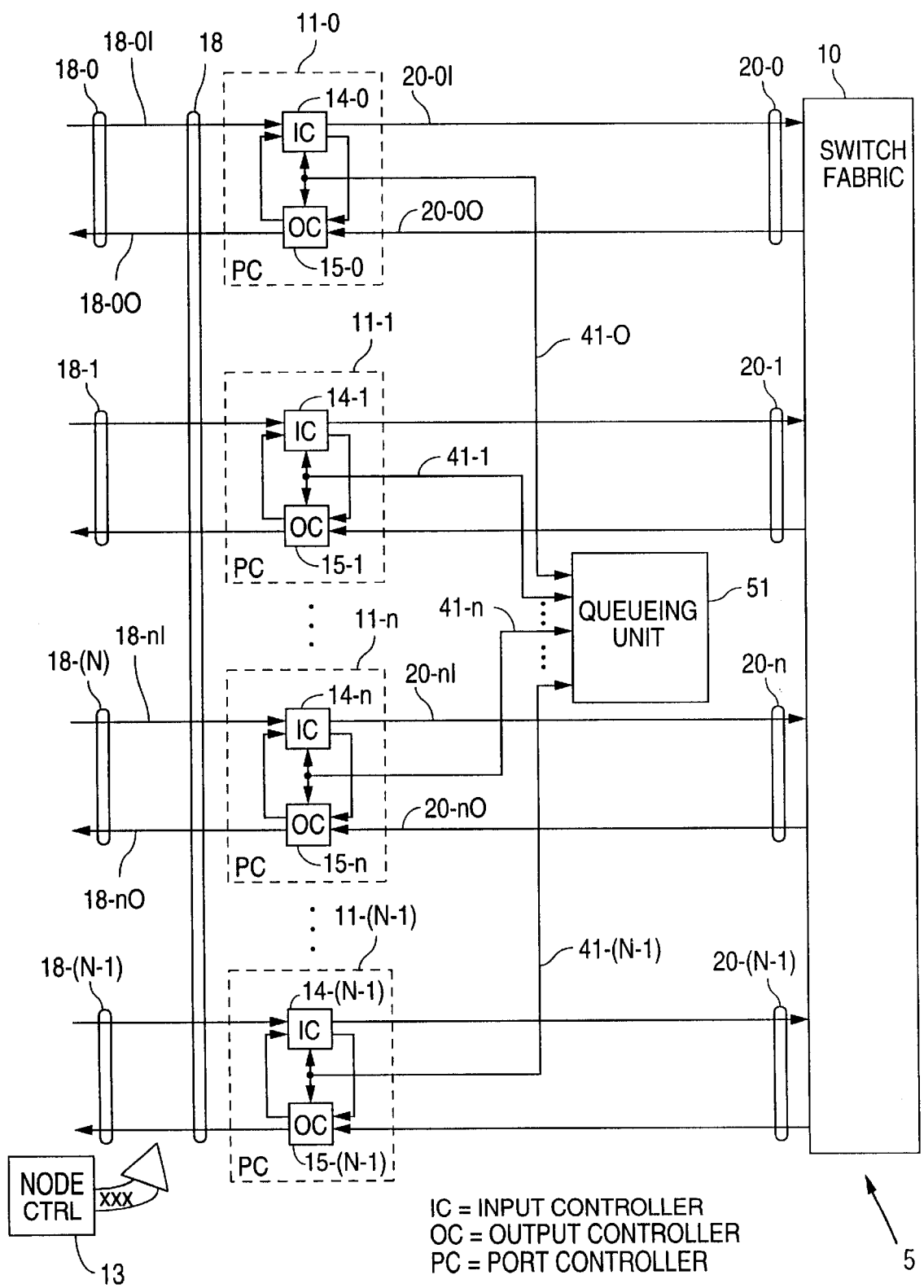
FIG. 4 depicts a schematic representation of a typical one of the nodes (N) in the FIG. 1 network.

In FIG. 4, one typical embodiment of a node having the signal paths of FIG. 3 is shown. In FIG. 4, the node 5 includes N links 18-0, 18-1, . . . , 18-n, . . . 18-(N1). Each of the links 18 of FIG. 4 are analogous to the bi-directional links 8 of FIG. 2. In FIG. 4, the links 18-0, 18-1, . . . , 18-n, . . . , 18-(N-1) connect to port controllers 11-0, 11-1, . . . , 11-n, . . . , 11-(N-1).

The node of FIG. 4 is used in connection with the information transfer of FIG. 3, for example, by having one of the links 18, for example, input link 18-0 in FIG. 4, connect through switch fabric 10 to another one of the links 18, for example, link 18-n. In the example described, the switch fabric 10 functions to connect the link 18-0 to the link 18-n.

In an example where the node of FIG. 4 represents the node 5-1 in FIG. 2, the link 8-1 in FIG. 2 is the link 18-0 in FIG. 4 and the link 8-2 in FIG. 2 is the link 18-n in FIG. 4.

With such a connection, the node of FIG. 4 connects information in one direction, for example, from link 18-0 to link 18-n, and connects information in the opposite direction from the link 18-n to the link 18-0. The links 18-0 and 18-n were arbitrarily selected for purposes of explanation. Any of the N links 18 might have been selected in the FIG. 2 circuit for connection to any of the other links 18.

When the node of FIG. 4 is used in the virtual channel connection of FIG. 3 with the source (S) on the left and the destination (D) on the right, then for purposes of explanation it is assumed that the link 18-0 is an input to the node 5 in the forward direction and the link 18-n is output from the node in the forward direction.

In FIG. 4, port controllers (PC) 11-0, 11-1, . . . , 11-n, . . . , ba 11-(N-1) have input controllers 14-0, 14-1, . . . , 14-n, . . . , 14-(N-1), respectively and have output controllers (OC) 15-0, 15-1, . . . 15-n, . . . , 15-(N-1), respectively. In FIG. 4, forward information cells from the source 4-S of FIG. 3 sent to the destination 4-(D) of FIG. 3 connect from the bus 18-01 through the input controller 14-0 to the bus 20-n O through the switch fabric 10 to the bus 20-nl through the controller 15-n to the bus 18-nO. The port controllers share a common buffer storage located in shared queuing unit 1 and are bidirectionally connected to unit 51 over buses 41-0, 41-41-n, . . . , 41-(N-1).

Queuing-Unit

FIG. 5

Figure 5:
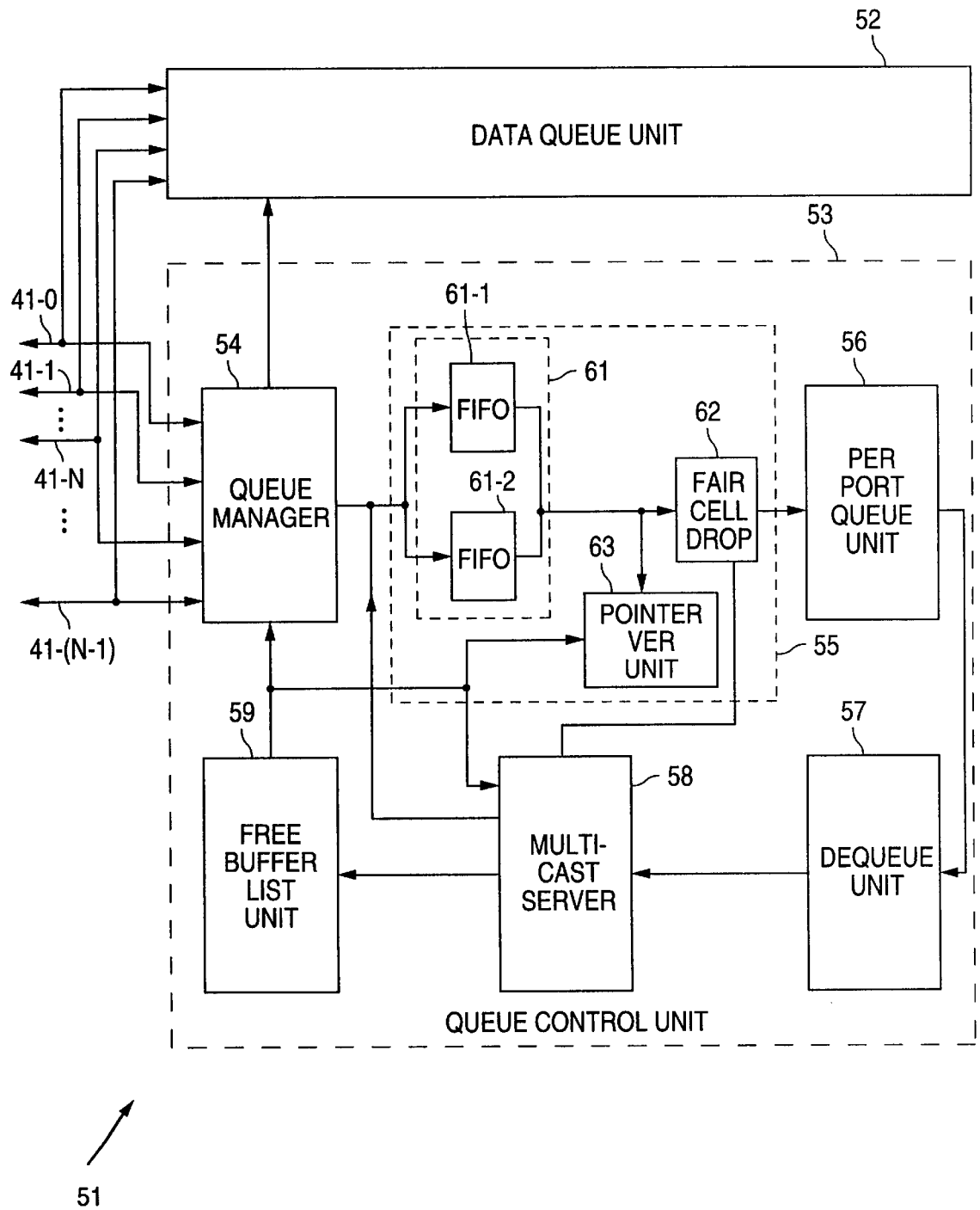
FIG. 5 depicts a schematic representation of the queuing unit in the FIG. 4 node.

In FIG. 5, the queueing unit 51 of FIG. 4 is shown in greater detail. The queuing unit 51 includes a data queue unit 52 and a queue control unit 53. The data queue unit 52 and the queue control unit 53 each connect to the bidirectional buses 41-0, 41-1, . . . , 41-n . . . 41-(N-1). The control information on the buses 41 connect to the queue control unit 53 and the data on the buses 41 connect to the data queue unit 52.

In FIG. 5, the queue control unit 53 includes a queue manager 54 which controls data queue unit 52 and the overall operation of the queueing unit 51. The queue manager typically includes a processing unit capable of executing software. Upon detection that input information on the buses 41 requires storage in the data queue unit 52, the queue manager 54 detects an available buffer location from the free buffer list unit 59 and assigns the available data location in the data queue unit 52. The general function and operation of queue managers are well known. In addition to queuing, and in order to operate with the methods of the present invention, certain cells may need to be discarded from time to time to promote efficient operation of the overall communication network. The discard unit 55 under control of the queue manager 54 determines when to discard queue assignments previously allocated. The results of the queuing operation are stored in the per port queue unit 56, which in turn activates the de-queue unit 57, which in turn operates through the multicast server 58 to remove buffer locations that have been previously allocated. Once removed, the de-queued buffer locations are added back to the free buffer list in the unit 59 and are available for reassignment.

Discard Unit 55. The discard unit 55 is composed of three units, FIFO unit 61 (including sub-units 61-1 and 61-2), discard unit 62, and pointer integrity unit 63. Discard unit 55 is responsible for:

1. Guaranteeing the contracted Quality of Service (QoS) of all the connections (by discarding offending connections).
2. Surveillance and control of buffer congestion.
3. Performing Explicit Forward Congestion Indication (EFCI) tagging in the ATM header when the buffer starts to become congested.
4. Performing a per connection cell and frame discard when the congestion becomes excessive.
5. Insuring fairness between the non-guaranteed connections (ABR, GFR, and UBR).
6. Providing different quality for ABR, GFR, and UBR traffic, by supporting various EFCI and discard thresholds.
7. Pointer integrity verification (verify that no pointer duplication occurs).

In the shared buffer architecture of FIG. 4, virtual channels (VCs) that do not limit their use can use all the available buffering thereby being unfair to other VC sources. This operation is not a problem for CBR, RT-VBR, and NRT-VBR traffic, since those two types of traffic are policed at the receive side. However, ABR and GFR traffic are policed only for the peak cell rate and not for the average and UBR is not policed at all. Because the cell pool is shared by all the Class of Service (CoS) sources for all the ports, various mechanisms are used to prevent delinquent ABR, GFR, or UBR sources (traffic contract violators) from filling the buffer pool, ultimately degrading the quality of other, better-behaved connections.

In one method a certain amount of buffering is reserved for the guaranteed traffic that cannot be used by non-guaranteed traffic. The exact amount to be reserved is found by adding the buffering needed by every CBR and VBR connection source. This reservation method implies that the number of ABR, GFR, and UBR cells present in the shared buffer is accounted for and that, when all the available buffer space has been used, any additional ABR, GFR, or UBR cells are dropped.

In the fair discard method described hereafter in greater detail, non-guaranteed traffic does not cause loss of guaranteed traffic. This fair discard method discards traffic at a particular maximum rate per cell for a given maximum en-queuing rate in FIFO unit 61 of FIG. 5. If a specified size cell margin is reserved for the guaranteed traffic, it would take a proportional burst of non-guaranteed traffic coming from all ports at line rate to start affecting the guaranteed traffic. Such a burst of non-guaranteed traffic is not probable so that, as a practical matter, the fair discard mechanism is sufficient by itself. Additionally, use of an almost empty flag to indicate when the free buffer list is almost exhausted is used in a preferred embodiment as a "hard" limit against non-guaranteed traffic when major congestion occurs.

Per Source Dynamic Discard Threshold.

The fair discard method employed in the common buffer pool (queuing unit 51 in FIG. 4) provides efficient usage of the available buffering space and guarantees some protection between all of the sources. A dynamic threshold is changed as a function of the total number of cells queued, the estimated offered load of the source, and the total number of connections established within a given class of service. Each VP/VC connection source has its own cell counter. When a cell is received, the decision to keep the cell or not is made by comparing the number of cells of that connection source present in the shared buffer pool, with the maximum number of cells allowed per connection source, this last number being a function of the total buffer pool utilization at that instant.

Figure 6:
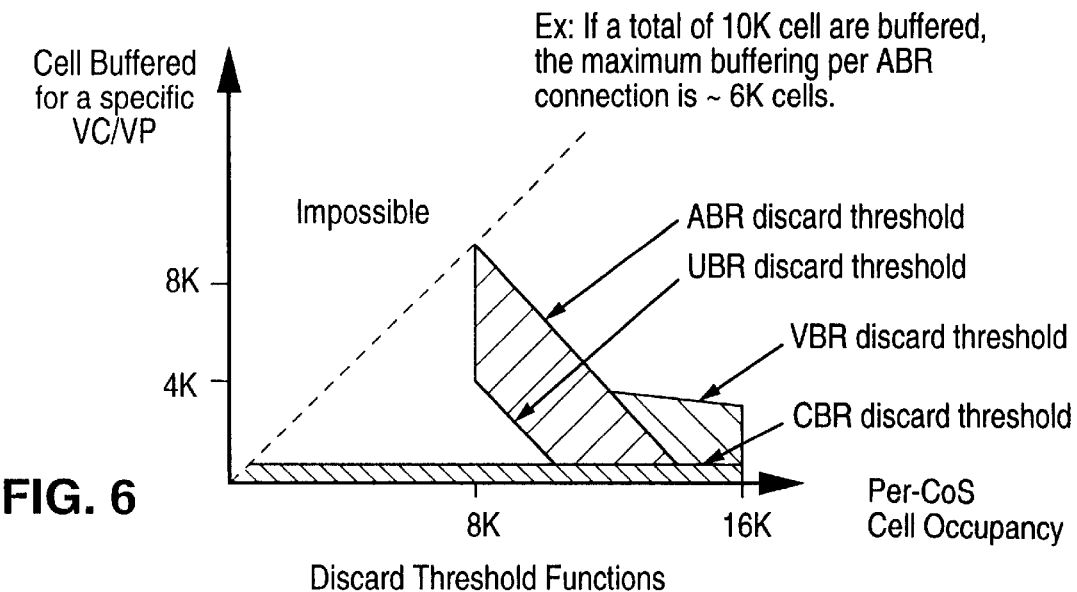
FIG. 6 depicts a representation of dynamic cell discard thresholds.

The principle of the dynamic method of the present invention is represented in FIG. 6. In FIG. 6, the horizontal axis represents the total number of cells buffered, the vertical axis represents the number of cells that can be buffered per connection source and the gray shaded area represents the region where cells are kept. Since the discard function data is maintained in random access memory it is easy to modify, according to the traffic distribution. Different discard functions can be used for every type of bit, COS, QoS, CLR, CLP bits, for example.

Beside protecting the connection sources from each other, this dynamic discard method also establishes fairness between the UBR connection sources. When many UBR connection sources are pre-sent, each one attempts to get as much bandwidth as possible. The net effect of this attempt is to slowly fill the buffer. As the buffer is filled, the maximum amount of buffering per connection source is decreased. The connection sources buffering cells at a level closest to their individual fair weighting are the first to be dropped and, eventually, the number of cells buffered for every UBR or GFR connection source within a given weight tends to become uniform. The same is also true for ABR traffic during transitions. In the normal case, the ABR control loops insure that the average bandwidth of all the connection sources is less than the available bandwidth. However, if the available bandwidth is temporarily exceeded, the total number of cells buffered goes up and the maximum amount of buffer per connection source start going down. When this happens, the connection sources using the most buffering (also the most likely offenders) are the first to see their traffic discarded. This operation again results in a fair sharing of the available buffering between all the connection sources.

The fair discard method waits for a cell to be present in one of two FIFOs 61-1 and 61-2 in unit 61. When both FIFOs 61-1 and 61-2 contain data, the highest priority FIFO 61-1 is always dequeued first. In one embodiment, within a period of 100nS, the cell discard mechanism reads the cell pointer and descriptor and decides if the cell is to be dropped or passed to the queue.

When a cell is accepted, the cell counter for its connection source and the total cell counter for all sources are incremented. When a cell is rejected, the corresponding cell counter and total cell counter remain unchanged. When a cell is dequeued from the buffer pool, the corresponding cell counter for that connection source and the total cell counter for all sources are both decremented.

Per Sub-class Discard Threshold.

Different discard threshold functions can be used by the dynamic discard method to provide control over the cell loss ratio (CLR). Since the discard threshold is a function of the total cells buffered (of all types), the exact statistical relation between the total amount of cells buffered, the discard threshold, and the CLR is generally non-deterministic (unless the amount of traffic for every class is limited to known values). As a consequence, the discard threshold function in general does not guarantee a specific CLR. It does, however, control the relative behavior of the CLR between different sub-classes within a particular class. Having different discard thresholds is particularly useful for non-guaranteed traffic like ABR, GFR, and UBR as it can be used to control the relative behavior of the CLR between different sub-classes within a particular class.

For NRT-VBR, the CAC bit controls the amount of VBR traffic allowed in order to insure a Cell Loss Ration (CLR) approaching zero. For conforming CBR connection sources, the expected amount of buffering is always expected to be low so that multiple CBR discard thresholds are not useful. A similar argument holds for RT-VBR. However, multiple discard thresholds are employed for RT-VBR connections in order to support both Cell Loss Priority (CLP)-transparent and CLP-nontransparent services.

Congestion Indication (EFCI)

FIG. 7

Figure 7:
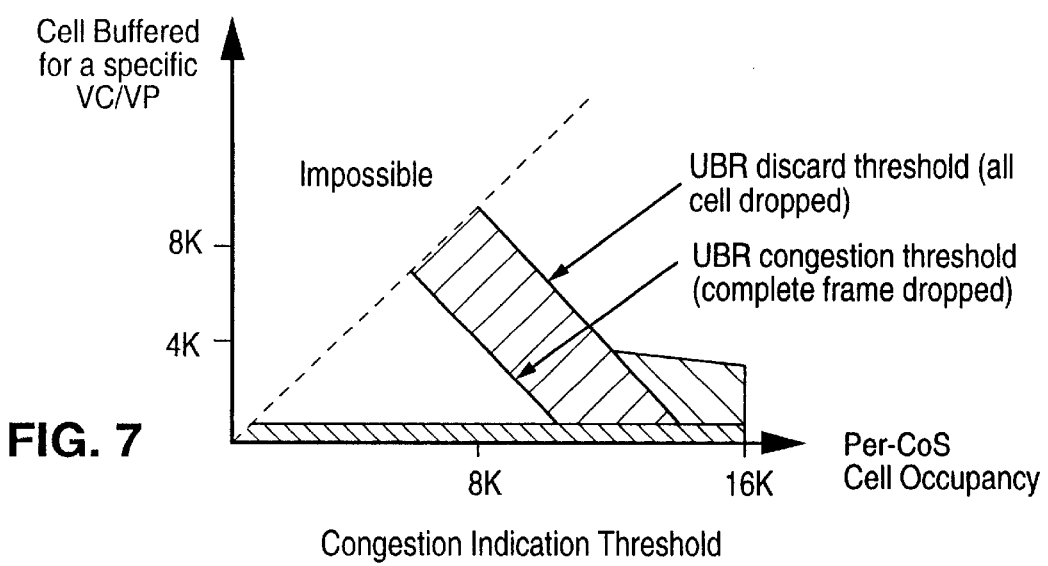
FIG. 7 depicts a schematic representation of congestion indication and frame discard thresholds.

The congestion indication is obtained with operations analogous to the fair discard operations. A set of curves describes whether or not a connection source has reached the congestion level. When a cell is dequeued, the dequeue mechanism gets the congestion state of the corresponding connection source from the fair discard subsystem and sets the EFCI output bit accordingly. FIG. 7 represents the congestion indication values analogous to the FIG. 6 fair discard values.

AAL5 Packet Discard

When possible, it is more efficient to drop complete frames instead of random cells from frames. This packet discard function is implemented in the dynamic discard method of the present invention. When an ATM Adaptation Layer type 5 (AAL5) cell is received, if the connection source has passed the congestion indication threshold, but not yet reached the discard threshold, only complete frames are discarded. When the discard threshold is passed, all the cells are dropped, regardless of their position in the frame. When a frame starts to be discarded, a flag is set to indicate that the remaining cells of the frame are to be discarded, regardless of the congestion level, until the last cell of the frame.

Fair Discard and Congestion Indication Block Diagram

FIG. 8

Figure 8:
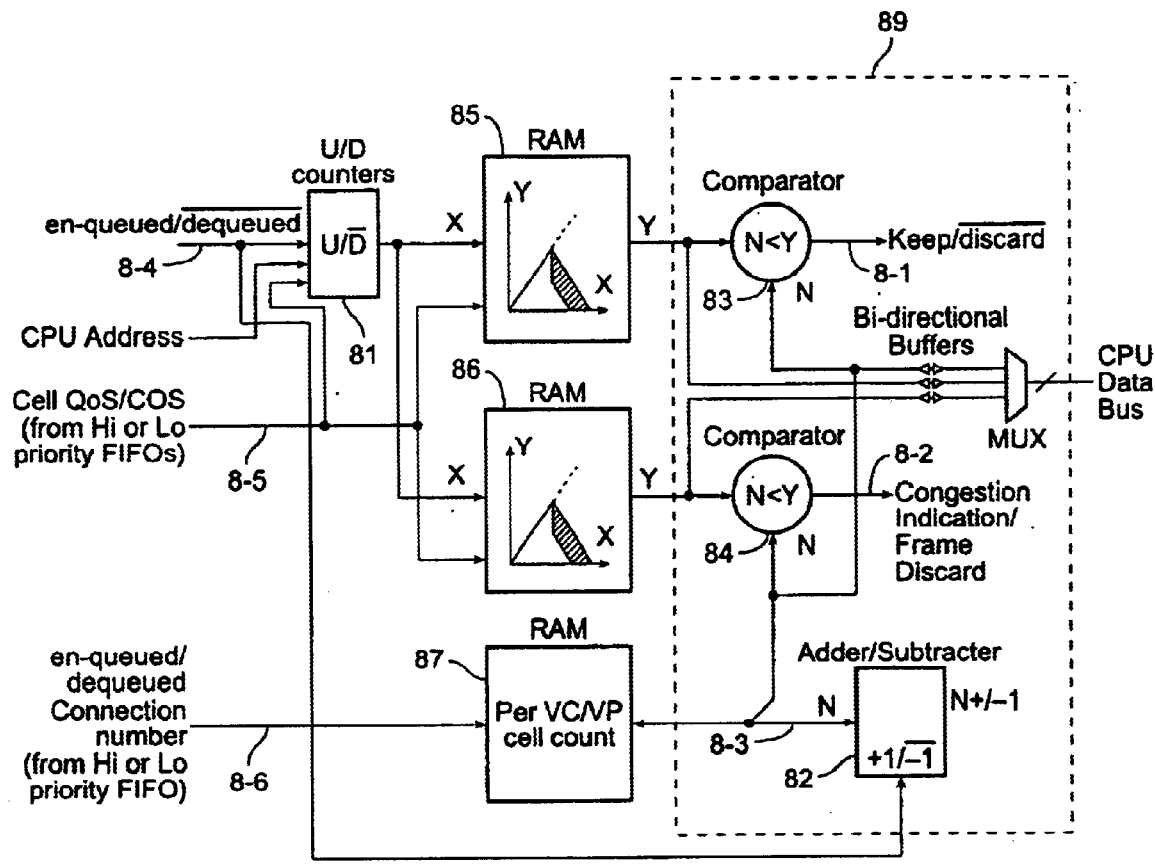
FIG. 8 depicts a block diagram representation of the fair discard and congestion indication.

In FIG. 8, one schematic embodiment of the fair discard Unit 55 of FIG. 5 is shown along with a per connection congestion detection structure and flow. In FIG. 8, the three up/down counters 81 count the number of cells which are queued (up for enqueue, down for dequeue) for all sources of each class of service. The values from the up/down counters 81 are the total cell count per class of service in the buffer and are used as input into RAM 85 for obtaining the fair discard value and into the RAM 86 for obtaining the congestion indication value. RAM 87 stores a cell count for each cell source as a function of the cell source's connection number and provides an output N that is updated for each cell en-queued or dequeued. RAM 85 provides an output value representative of the Y axis based on the X axis input from one of the up/down counters 81, as described in connection with FIG. 6. The output value is then compared in comparator 83 with the number N of cells buffer for the connection for a particular cell source obtained from RAM 87. The per source value of N is compared in comparator 83 with the Y-axis output from RAM 85 to provide the keep or discard signal for the fair discard method. The output N is also compared with the value from the y axis from the RAM memory 86 in comparator 84 to form a congestion indication if N is less than Y from memory 86.

Each time a cell is enqueued or dequeued for a particular cell source, the cell count for that source is stored in RAM 87 and the adder/subtractor 82 causes the counter 81 to be incremented or decremented by one.

Figure 9:
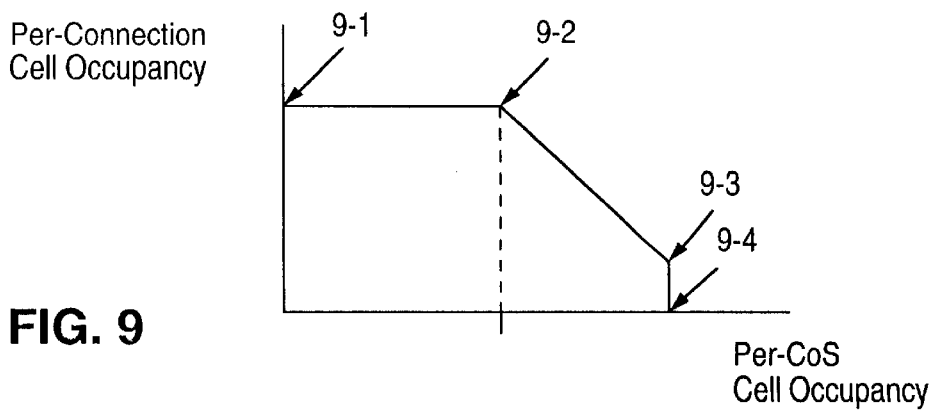
FIG. 9 illustrates the relevant parameters for making discard decisions.

Creation and Adjustment of Discard Thresholds
FIG. 9

Referring next to FIG. 9, there is provided a curve illustrating the four relevant parameters for making discard decisions according to the method and system of the present invention, including: the maximum number of cells allowed in a buffer for a connection at any given cell time; the number of established connections for a given CoS; the number of cell buffers guaranteed to a connection when operating under load; and the maximum number of cells allowed in the buffer for the corresponding CoS.

Each of the four marked points 9-1, 9-2, 9-3 and 9-4 in FIG. 9 correspond to one of the above-listed four criteria. Point 9-1 represents the y-axis maxima, preferably a function of traffic arrival intensity. A currently preferred method of setting point 9-1 comprises a worst-case scenario approach, accounting for cell rate, egress rate and shared buffer size according to equation 1:

$$\text{inputLoad}_{max} = [(\text{cellRate} * \text{SHBUFSIZE})/\text{egressRate}].$$

This approach provides for a reasonable, early estimate of the maximum number of cell buffers required by a given connection. In this equation, the term cellRate comprises either the peak cell rate, or some value between the sustained and peak rates (e.g., the calculated equivalent capacity for VBR connections). The term egressRate represents the slowest physical port rate found on the MSU—a worst case loading scenario.

Point 9-2, where the curve slope becomes negative, is applicable to curves in which the discarding of cells, due to congestion, is acceptable. For CBR cells, and CLP(O) cell flows of VBR connections (or CLP(0+1) of VBR.1 connections), discarding toe to congestion is undesirable (due to the CLR objectives). Thus, the curves for these connection types will not contain a point at which the slope becomes negative (but rather will have a zero slope from x=) to x=max). For all other cell types, a negative slope (point 2) is appropriate, although the degree of slope will vary.

The position of point 9-2 on the curve is best estimated by the number of connections generating the aggregate buffer load (per CoS), since the probability of congestion increases in relation to the number of connections admitted. Due to the general inability of available hardware to track the number of active connections, one embodiment simply look to the number of established connections as an approximation. In an adaptive curve management embodiment, the actual number of connections per MSU is tracked as the connections are established.

Point 9-3 is particularly relevant to ABR connections, where it relates to the minimum cell rate. Of course, cells at or below the minimum cell rate should be provided some pre-determined loss guarantees. Thus, the "knee" in the discard curve of FIG. 9 at point 9-3 is particularly relevant for any service which allows guaranteed buffer space under load for a given connection (e.g., Guaranteed Frame Rate GFR). Point 9-2 can also be defined by substituting MCR for the term cellRate in equation (1).

Finally, for any given collection of curves in a CoS, the greatest x-axis value for point 9-4 represents the shared buffer partition for that CoS, providing guaranteed buffer space for traffic having CLR objections. A static mode method of curve generation will estimate the shared buffer partitions based on the user-defined configuration values of each port found on the MSU. An adaptive mode of curve management will adjust these partition dynamically, adapting to the modulating call-level load.

Figure 10:
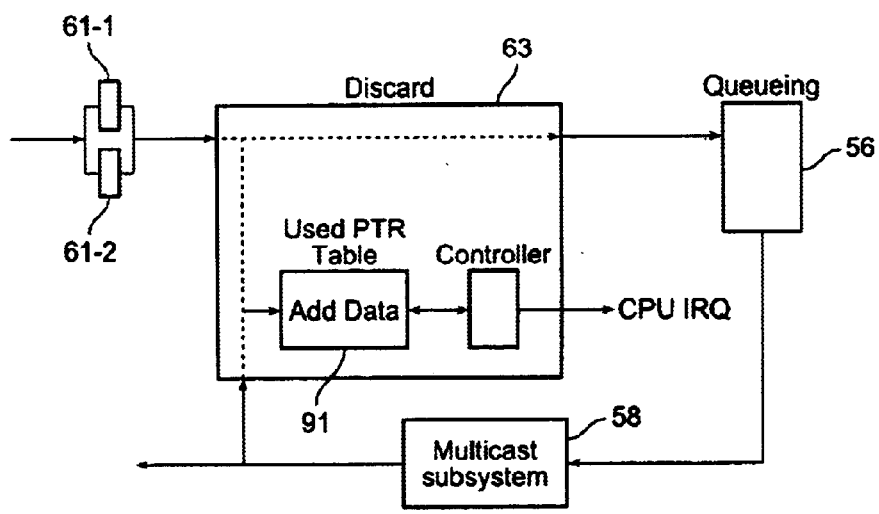
FIG. 10 depicts a schematic representation of the pointer integrity verification.

Pointer Integrity Verification
FIG. 10

In FIG. 10, further details of the pointer verification unit 63 of FIG. 5 are shown. The verification unit 63 is useful since parity detectors used to verify the integrity of cell descriptors are useless to detect problems like duplicated pointers, which could cause queues to merge together. The verification unit 63 detects duplicated pointers by monitoring and updating a set of "pointer in use" flags every time a pointer enters or leaves the queuing system. When a pointer is enqueued, the verification system first checks that the "in use" flag for that pointer is cleared in a pointer table 91 and then sets it. When the cell is dequeued, the verification system confirms that the "in use" flag of the dequeued pointer is set in table 91 and then clears it. Any error detected is immediately signaled to the main CPU (queue manager 54) with a CPI interrupt request (IRQ).

The CPU initially performs a memory initialization on each of the RAM memory units: discard threshold memory; per connection cell count memory; and per connection cell dropped memory. The CPU then clears all the count memories and programs the various discard and congestion thresholds, and the three COS cell counters used in the discard subsystem are cleared. Reading the first counter returns the combined number of CBR and VBR cells buffered, the second counter returns the number of ABR cells and the third the number of UBR cells. The total number of cells queued is equal to the sum of the three counters.

While one specific embodiment of the present invention has been described, it will be clear to those who are skilled in the art that various modifications of the present invention can be made without departing from its scope and spirit. It should be realized that the precise components described in embodiments of the invention are not critical to its operation. In particular, any of a variety of digital signal processors and other combinations of hardware, and computer programs incorporating the signal processing algorithms can be used to accomplish the desired results. The present invention and its advantages will be understood from the foregoing description and it will be apparent that various changes may be made thereto without departing from the spirit and scope of the invention.

What is claimed is:

1. A communication system comprising,
a plurality of sources for supplying information,
a plurality of destinations for receiving said information from said sources,
one or more nodes forming a network connecting the sources to the destinations, said network having a plurality of channels for transporting said information where, for each channel,
one of said plurality of sources is linked to one of said plurality of destinations through said network by linking forward paths from one or more nodes, said one of said plurality of destinations is linked to said one of said plurality of sources through said network by linking return paths from said one or more nodes, and where each of said one or more nodes includes queueing means for queueing said information from said plurality of sources, each of said queueing means including, buffer memory having a full buffer capacity and a used buffer capacity less than or equal to said full buffer capacity where each of said sources has a used source buffer capacity that is a portion of the used buffer capacity of said buffer memory, indicator means for indicating the used source buffer capacity for each of said sources and the used buffer capacity of said buffer memory, dynamic allocation means for allocating for each of said sources, as a particular source, an allocated source buffer capacity for said used source buffer capacity in said buffer memory for said particular source as a function of the used buffer capacity of said buffer memory in relation to the full capacity and as a function of said used source buffer capacity for said particular source.

2. The communication system of claim 1 wherein each of said nodes includes discard means for discarding information from said particular source when the used source buffer capacity exceeds the allocated source buffer capacity for said particular source.

3. The communication system of claim 1 wherein each of said sources have a source classification of service and wherein said dynamic allocation means functions in response to said classification of service.

4. The communication system of claim 1 wherein each of said nodes includes discard means for discarding information from said particular source when the used source buffer capacity exceeds the allocated source for said particular source.

5. The communication system of claim 1 wherein each of said each of said sources and each of said nodes form an ATM network with virtual channels connecting said sources and destinations and wherein said information is transmitted in packetized cells.

6. A communication system having reactive congestion control comprising:

a plurality of sources, each source including a modifiable issue rate unit which transmits forward information signals at different transmission rates in response to congestion signals, said issue rate unit decreasing the transmission rate in response to congestion signals, a plurality of destinations, one or more nodes forming an asynchronous transfer mode (ATM) network connecting the sources to the destinations, each node including, a forward path for transfer of information in a forward direction toward a destination through the ATM network, a return path for returning congestion signals in a reverse direction through the ATM network toward a source, queueing means for queueing said information from said plurality of sources, each of said queueing means including, buffer memory having a full buffer capacity and a used buffer capacity less than or equal to said full buffer capacity where each of said sources has a used source buffer capacity that is a portion of the used buffer capacity of said buffer memory, indicator means for indicating the used source buffer capacity for each of said sources and the used buffer capacity of said buffer memory, dynamic allocation means for allocating for each of said sources, as a particular source, an allocated source buffer capacity for said used source buffer capacity in said buffer memory for said particular source as a function of the used buffer capacity of said buffer memory in relation to the full buffer capacity and as a function of said used source buffer capacity for said particular source, congestion signal generating means for generating congestion signals for said particular source in response to congestion in the node as a function of the used buffer capacity of said buffer memory in relation to the full buffer capacity and as a function of said used source buffer capacity for said particular source, said ATM network having a plurality of virtual channels where, for each virtual channel, one of said plurality of sources is linked to one of said plurality of destinations through said ATM network by linking forward paths from one or more nodes, and wherein said issue rate unit transmits forward information signals at different transmission rates in response to congestion signals over the virtual channel, said one of said plurality of destinations is linked to said one of said plurality of sources through said ATM network by linking return paths from said one or more nodes, the congestion signal generating means in one of said one or more nodes generated said congestion signals for the virtual channel in response to congestion in said one of said one or more nodes.

7. The communication system of claim 6 wherein said issue rate unit increases the transmission rate in response to the absence of congestion signals.

8. The communication system of claim 6 wherein the a transmission interval for a congestion signal returning from a congested node to the source is less than an interval between information signals transmitted over the virtual channel whereby the issue rate unit reactively responds to modify the transmission rate to reduce congestion.

9. A wide-area communication system having both local reactive and predictive congestion control components comprising, a plurality of local communication systems, each local communication system including, a plurality of local sources, each local source including a modifiable issue rate unit which transmits forward information signals at different transmission rates, said issue rate unit decreasing the transmission rate in response to the presence of congestion signals and increasing the transmission rate in response to the absence of congestion signals, a plurality of local destinations, one or more local nodes forming an asynchronous transfer mode (ATM) local network connecting the sources to the destinations, each local node including, a forward path for transfer of information at different selectable transmission rates in a forward direction toward a destination through, the ATM local network, a return path for returning congestion signals in a reverse direction through the ATM local network toward a source, congestion signal generating means for generating requests for congestion signals in response to congestion in the local node, filter means for filtering said requests and for responsively providing said congestion signals, said ATM local network having a plurality of virtual channels where, for each virtual channel, one of said plurality of local sources is linked to one of said plurality of local destinations through said ATM local network by linking forward paths from one or more local nodes, and wherein an issue rate unit in said one of said plurality of local resources transmits forward information signals at different transmission rates in response to congestion signals over the virtual channel, said one of said plurality of local destinations is linked to said one of said plurality of local sources through said ATM local network by linking return paths from said one or more, nodes, the congestion signal generating means in one of said local nodes generates said requests for congestion signals for the virtual channel in response to congestion in said one of said local nodes, one or more wide-area sources connected to an ATM local network in one of said local communication systems, one or more wide-area destinations connected to another ATM local network in one of said local communication systems, a plurality of virtual channels where, for each virtual channel, one of said one or more wide-area sources is linked to one of said one or more wide-area destinations through said local communication systems.

10. A wide-area communication system having both local reactive and predictive congestion control components comprising, a plurality of local communication systems, each local communication system including, a plurality of local sources, each local source including a modifiable issue rate unit which transmits forward information signals at different transmission rates, said issue rate unit decreasing the transmission rate in response to the presence of congestion signals and increasing the transmission rate in response to the absence of congestion signals, a plurality of local destinations, one or more nodes forming an asynchronous transfer mode (ATM) local network connecting the sources to the destinations, each local node including, a forward path for transfer of information at different selectable transmission rates in a forward direction toward a destination through the ATM local network, a return path for returning congestion signals in a reverse direction through the ATM local network toward a source, queueing means for queueing said information from said plurality of sources, each of said queueing means including, buffer memory having a full memory capacity and a used memory capacity less than or equal to said full memory capacity where each of said sources has a used source capacity that is a portion of the used memory capacity of said buffer memory, indicator means for indicating the used source capacity for each of said sources and the used memory capacity of said buffer memory, dynamic allocation means for allocating for each of said sources, as a particular source, an allocated source capacity for said used source capacity in said buffer memory for said particular source as a function of the used memory capacity of said buffer memory in relation to the full memory capacity and as a function of said used source capacity for said particular source congestion signal generating means for generating requests for congestion signals for said particular source in response to congestion in the local node as a function of the used memory capacity of said buffer memory in relation to the full memory capacity and as a function of said used source capacity for said particular source, filter means for filtering said requests and for responsively providing said congestion signals, said ATM local network having a plurality of virtual channels where, for each virtual channel, one of said plurality of local sources is linked to one of said plurality of local destinations through said ATM local network by linking forward paths from one or more local nodes, and wherein said issue rate unit transmits forward information signals at different transmission rates in response to congestion signals over the virtual channel, said one of said plurality of local destinations is linked to said one of said plurality of local sources through said ATM local network by linking return paths from said one or more nodes, the congestion signal generating means in one of said local nodes generates said requests for congestion signals for the virtual channel in response to congestion in said one of said local nodes, one or more wide-area sources connected to an ATM local network in one of said local communication systems, one or more wide-area destinations connected to another ATM local network in one of said local communication systems, a plurality of local network links interconnecting two or more ATM local networks in said local communication systems to form a wide-area network, said wide-area network having a plurality of virtual channels where, for each virtual channel one of said plurality of wide-area sources is linked to one of said plurality wide-area destinations through a plurality of said local networks over said local network links.

11. The wide-area communication system of claim 10 wherein the transmission interval for a congestion signal returning from a congested local node to the local source is short thereby enabling the issue rate unit to reactively modify the transmission rate and thereby reduce congestion in the wide-area communication system.

12. The wide-area communication system of claim 10 wherein the transmission interval for a congestion signal returning from a congested local node to the local source is less the interval between information signals transmitted over the virtual channel whereby the issue rate unit reactively responds to modify the transmission rate to reduce congestion in the wide-area communication system.

13. The wide-area communication system of claim 10 wherein the transmission interval for a congestion signal returning from a congested local node to the local source is less than ten intervals between information signals transmitted over the virtual channel whereby the issue rate unit reactively responds to modify the transmission rate to reduce congestion in the wide-area communication system.

14. The wide-area communication system of claim 10 wherein the processing time required to generate a congestion signal at each node is much less than said transmission interval for a congestion signal.

15. The communication system of claim 10 wherein said issue rate unit, after decreasing said transmission rate, has means for increasing said transmission rate in response to the absence of a congestion signal with said increase varying with the transmission rate whereby lower transmission rates increase faster than higher transmission rates.

16. The wide-area communication system of claim 14 wherein said forward information is fragmented into cells, each cell including a virtual channel identifier, and wherein each node includes a switching element, each switching element including, a switch fabric, a plurality of port controllers interconnected by said switch fabric, each of said port controllers including, an input controller, and an output controller, congestion detection means for detecting congestion in the node, and reversing means for copying a cell, having a virtual channel identifier, from the forward path to the return path to thereby generate a congestion signal.

17. A communication system comprising, a plurality of sources for supplying information, a plurality of destinations for receiving said information from said sources, one or more nodes forming a network connecting the sources to the destinations, said network having a plurality of channels for transporting said information where, for each channel, one of said plurality of sources is linked to one of said plurality of destinations through said network by linking forward paths from one or more nodes, said one of said plurality of destinations is linked to said one of said plurality of sources through said network by linking return paths from said one or more nodes, and where each of said one or more nodes includes a storage resource for queueing said information from said plurality of sources, the storage resource including, a buffer memory having a full buffer capacity and a used buffer capacity less than or equal to said full buffer capacity where each of said sources has a used source buffer capacity that is a portion of the used buffer capacity of said buffer memory, and a control unit for allocating for each of said sources, as a particular source, an allocated source buffer capacity for said used source buffer capacity in said buffer memory for said particular source as a function of the used buffer capacity of said buffer memory in relation to the full buffer capacity and as a function of said used source buffer capacity for said particular source.

18. A method for communicating in a network environment comprising, connecting a plurality of sources for supplying information with a plurality of destinations for receiving said information from said sources, wherein one or more nodes form a network connecting the sources to the destinations, said network having a plurality of channels for transporting said information where, said connecting step including, for each channel, linking one of said plurality of sources to one of said plurality of destinations through said network by linking forward paths from one or more nodes, linking said one of said plurality of destinations to said one of said plurality of sources through said network by linking return paths from said one or more nodes, queueing said information from said plurality of sources at each of said one or more nodes, using a buffer memory having a full buffer capacity and a used buffer capacity less than or equal to said full buffer capacity where each of said sources has a used source capacity that is a portion of the used buffer capacity of the buffer memory, and dynamically allocating for each of said sources, as a particular source, an allocated source buffer capacity for said used source buffer capacity in said buffer memory for said particular source as a function of the used buffer capacity of said buffer memory in relation to the full buffer capacity and as a function of said used source buffer capacity for said particular source.

\* \* \* \* \*